(12) United States Patent
Haykal et al.

(10) Patent No.: US 8,793,260 B2
(45) Date of Patent: Jul. 29, 2014

(54) RELATED PIVOTED SEARCH QUERIES

(75) Inventors: Salem Elie Haykal, Mercer Island, WA (US); Daniel Thomas Herron, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 111 days.

(21) Appl. No.: 13/440,977

(22) Filed: Apr. 5, 2012

(65) Prior Publication Data

US 2013/0268521 A1  Oct. 10, 2013

(51) Int. Cl.
*G06F 17/30* (2006.01)

(52) U.S. Cl.
USPC .......................................................... 707/749

(58) Field of Classification Search
USPC .................. 707/723, 726, 749, 773
See application file for complete search history.

(56) References Cited

U.S. PATENT DOCUMENTS

| | | | |
|---|---|---|---|
| 7,552,112 B2 | 6/2009 | Jhala et al. | |
| 7,747,601 B2 | 6/2010 | Cooper et al. | |
| 8,627,013 B2 * | 1/2014 | Musumeci et al. | 711/137 |
| 2007/0294240 A1 | 12/2007 | Steele et al. | |
| 2009/0006358 A1 | 1/2009 | Morris et al. | |
| 2009/0228830 A1 * | 9/2009 | Herz et al. | 715/808 |
| 2010/0017363 A1 * | 1/2010 | Bellamkonda et al. | 707/2 |
| 2010/0042576 A1 * | 2/2010 | Roettger et al. | 706/55 |
| 2010/0287175 A1 | 11/2010 | Beaudreau et al. | |
| 2010/0318537 A1 * | 12/2010 | Surendran et al. | 707/759 |
| 2011/0055214 A1 * | 3/2011 | Mui et al. | 707/737 |
| 2011/0055226 A1 * | 3/2011 | Martino et al. | 707/749 |
| 2011/0072010 A1 * | 3/2011 | Wu et al. | 707/722 |
| 2011/0072046 A1 * | 3/2011 | Chi | 707/773 |
| 2011/0231347 A1 | 9/2011 | Xu et al. | |
| 2011/0238615 A1 * | 9/2011 | Sinha | 706/52 |
| 2012/0072860 A1 * | 3/2012 | Sridhar | 715/765 |
| 2012/0117048 A1 * | 5/2012 | Rosenoff et al. | 707/706 |
| 2012/0303664 A1 * | 11/2012 | Apacible et al. | 707/780 |

OTHER PUBLICATIONS

Baeza-Yates, et al., "Query Recommendation using Query Logs in Search Engines", Retrieved at <<http://www.google.co.in/url?sa=t&rct=j&q=&esrc=s&source=web&cd=1&ved=0CCsQFjAA&url=http%3A%2F%2Fciteseerx.ist.psu.edu%2Fviewdoc%2Fdownload%3Fdoi%3D10.1.1.85.8688%26rep%3Drep1%26type%3Dpdf&ei=yAhoT9SRDcSlrAfEil2KCA&usg=AFQjCNHKtskqqpEW-g0MtoFK5URUkghPWw&sig2=JqkfO1Je34LvwF2SzGjQKQ>>, Current Trends in Database Technology—EDBT, 2004, 10 pages.

* cited by examiner

*Primary Examiner* — Cam-Linh Nguyen
(74) *Attorney, Agent, or Firm* — Dave Ream; Doug Barker; Mickey Minhas (57) ABSTRACT

Systems and methods for responding to search queries with search results and related pivoted search queries is presented. Responsive to a search query, one or more entities related to the search query are identified as pivot entities. For each pivot entity a set of pivoted search queries is identified and included among the search results responsive to the search query.

20 Claims, 5 Drawing Sheets

RELATED PIVOTED SEARCH QUERIES

BACKGROUND

It is well-known that most users typically do not submit a "good" search query when searching for a specific item or topic. Typically, a user's search query will only approximate the sought-for topic. Thus, a user must spend excess time while he/she iterates through query/response cycles as the scope of the search query is refined and/or narrowed. Search engines often offer related search queries in the search results pages that they generate. While helpful, these related search queries are based on statistical relationships of the form: people that submit query $Q_1$ (or similar queries) often query $Q_2$ as well.

SUMMARY

The following presents a simplified summary in order to provide a basic understanding of various embodiments described herein. This summary is not an extensive overview, and it is not intended to identify key and/or critical elements or to delineate the scope thereof. The sole purpose of this summary is to present some concepts in a simplified form as a prelude to the more detailed description that follows.

According to at least one embodiment of the disclosed subject matter, a method for responding to a search query is presented. In operation, the method identifies a plurality of entities specified in a search query received from a user. A set of search results is then obtained, responsive to the search query. A pivot entity is selected from the plurality of entities and a pivoted set of search queries relating to the pivot entity is obtained. A search results page is generated. The search results page includes at least some of the obtained search results and the pivoted set of search queries. The search results page is returned to the user responsive to the search query.

According to yet other embodiments of the disclosed subject matter, a computer system for responding to a search query with related queries is presented. The system comprises at least a processor, a memory, and a network communication component. In executing the instructions stored in the memory, the system is configured to respond to a search query with related queries. The system further includes a search results retrieval component that obtains a plurality of search results responsive to receiving a search query; a pivot queries component that selects a pivot entity from a plurality of identified entities and obtains a pivoted set of search queries relating to the pivot entity; and a search results page generator component that generates a search results page and returns the generated search results page responsive to the search query. The generated search results page includes a subset of the plurality of obtained search results responsive to the search query, and further includes a subset of the pivoted set of search queries, the subset of the pivoted set of search queries being visually grouped together on the search results page.

According to additional embodiments of the disclosed subject matter, a computer-readable medium having computer-executable instructions is presented. The instructions, when executed on a computer system comprising at least a processor and a memory, carry out a method for responding to a search query with search results that include a set of related pivoted search queries. In one embodiment, the method includes: identifying a plurality of entities specified in a search query received from a user and obtaining a set of search results responsive to the search query. Thereafter, a pivot entity is selected from the plurality of identified entities. A pivoted set of search queries relating to the pivot entity is obtained and included in a generated search results page along with search results responsive to the search query. The search results page is then returned to the user.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposed of clarity, the use of the term "exemplary" in this document should be interpreted as serving as an illustration or example of something, and it should not be interpreted as an ideal and/or leading illustration of that thing.

As used in this document, the term "entity" refers to a concept, a person, or a thing. While a user will submit a search query typically including multiple terms, these terms (alone or in combination) relate to one or more entities. For example, a search query "Paris, France" is comprised of two terms ("Paris" and "France") but relates to a single entity, the capital city in France. Search queries may specify multiple entities. For example, the search query "Paris France Eiffel Tower" may be reduced to two entities, the capital of France (Paris) and the "Eiffel Tower."

As will be described more fully below, search queries are reduced to a set of query entities and one or more of the entities are selected as pivot entities. A "pivot entity" is an entity based on which related search queries are obtained. The related search queries will be referred to as "pivoted search queries", or alternatively as a "pivoted set of related search queries." The pivoted search queries are pivoted from the original search query because a different set of entities (other than an equivalence of the entities identified in the search query) are used in obtaining the pivoted search queries. Thus, a pivoted set of search queries may be based on all of the entities of the search query plus at least one other entity. Or, a pivoted set of search queries may be based on a subset of the entities identified in the search query (i.e., less than all of the search query entities). Further, a pivoted set of search queries may be based on a subset of the entities identified in the search query plus other related entities. For example, from the search query "Paris France Eiffel Tower," a pivot entity could be "Paris France" and the related search queries will be based on the pivot entity without specific consideration to "Eiffel Tower." Attributes common among the entities of a search query are used when "pivoting" on a pivot entity to generate or obtain a pivoted search of search queries. As will be appreciated, pivoting on an entity often assists the user in expanding the user's search scope.

Figure 1:
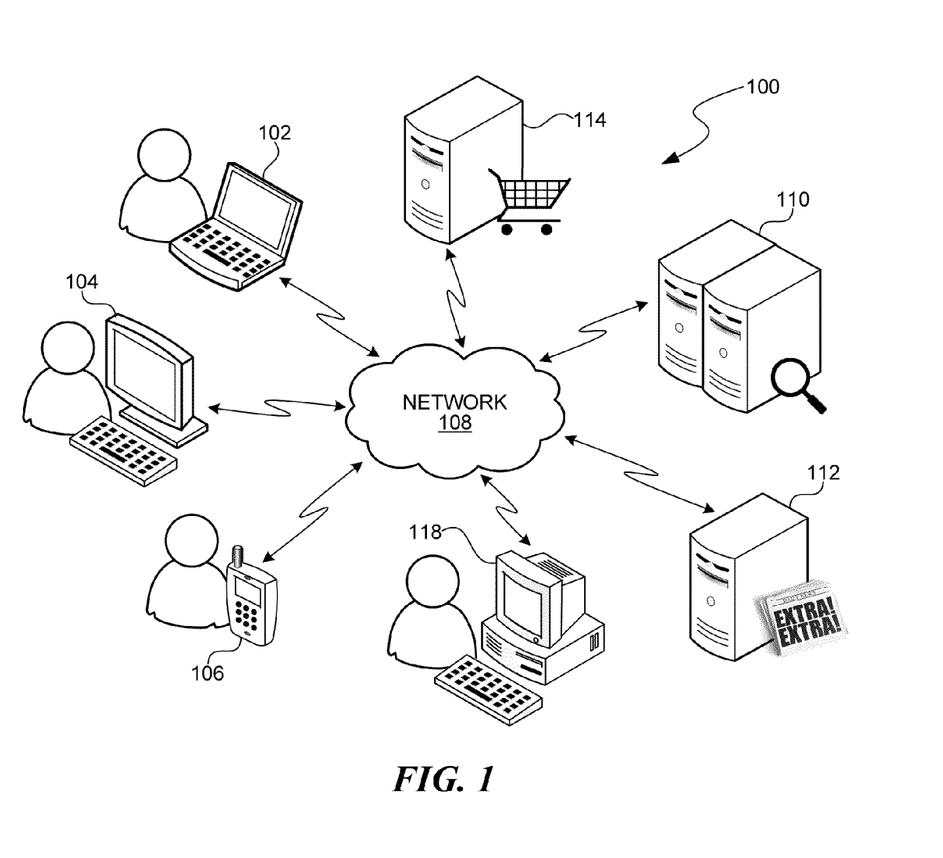
FIG. 1 shows a diagram of an illustrative environment in which aspects of the disclosed subject matter may be practiced.

Turning now to FIG. 1, this figure shows a diagram of an illustrative environment 100 in which aspects of the disclosed subject matter may be practiced. The illustrative environment 100 includes one or more user computers, such as user computers 102-106 and 118, connected to a network 108, such as the Internet, a wide area network or WAN, and the like. Also connected to the network 108 is a search engine 110. Those skilled in the art will appreciate that a search engine 110 corresponds to an online service hosted on one or more computers on, or computing systems distributed throughout, the network 108. The search engine 110 receives and responds to search queries over the network 108 from various users, such as the users connected to user computers 102-106 and 118. In response to receiving a search query, the search engine 110 obtains references to relevant content available from various target sites (such as target sites 112 and 114) on the network 108 and generates one or more search results pages responsive to the search query. According to various embodiments of the disclosed subject matter, the search engine 110 includes one or more pivoted sets of search queries within the search results pages that are returned in response to a user's search query. The search engine 110 is shown in FIG. 1 as comprising two computing devices but this is illustrative only.

As those skilled in the art will appreciate, target sites, such as target sites 114 and 116, host content that is available and/or accessible to users (via user computers) over the network 108. A search engine 110 will be aware of at least some of the content hosted on the many target sites located throughout the network 108, and will store information regarding the content hosted by the target sites in a content index (620 of FIG. 6). The search engine draws from the content index when providing search results in response to a search query. These target sites include, but are not limited to, news organization 112, shopping sites 114, and the like. Those skilled in the art will appreciate that any number and type of target sites may be connected to the network 108 and that the news and shopping sites shown in FIG. 1 are simply illustrative. Moreover, as is known in the art, some search engines are aware of millions of target sites and the content that is hosted by these target sites.

Suitable user computers for operating in the illustrative environment 100 include any number of computing devices that can communicate with the search engine 110 over the network 108 in both submitting search queries and receiving a response in the form of one or more search results pages from the search engine 110. User computers 102-106 and 118 may communicate with the network 108 via wired or wireless communication connections. These user computers 102-106 and 118 may include, but are not limited to, laptop computers such as user computer 102, desktop computers such as user computer 104, mobile phone devices such as user computer 106, tablet computers (not shown), on-board computing systems (not shown) such as those found in vehicles, mini- and/or main-frame computers (not shown), and the like.

Figure 2:
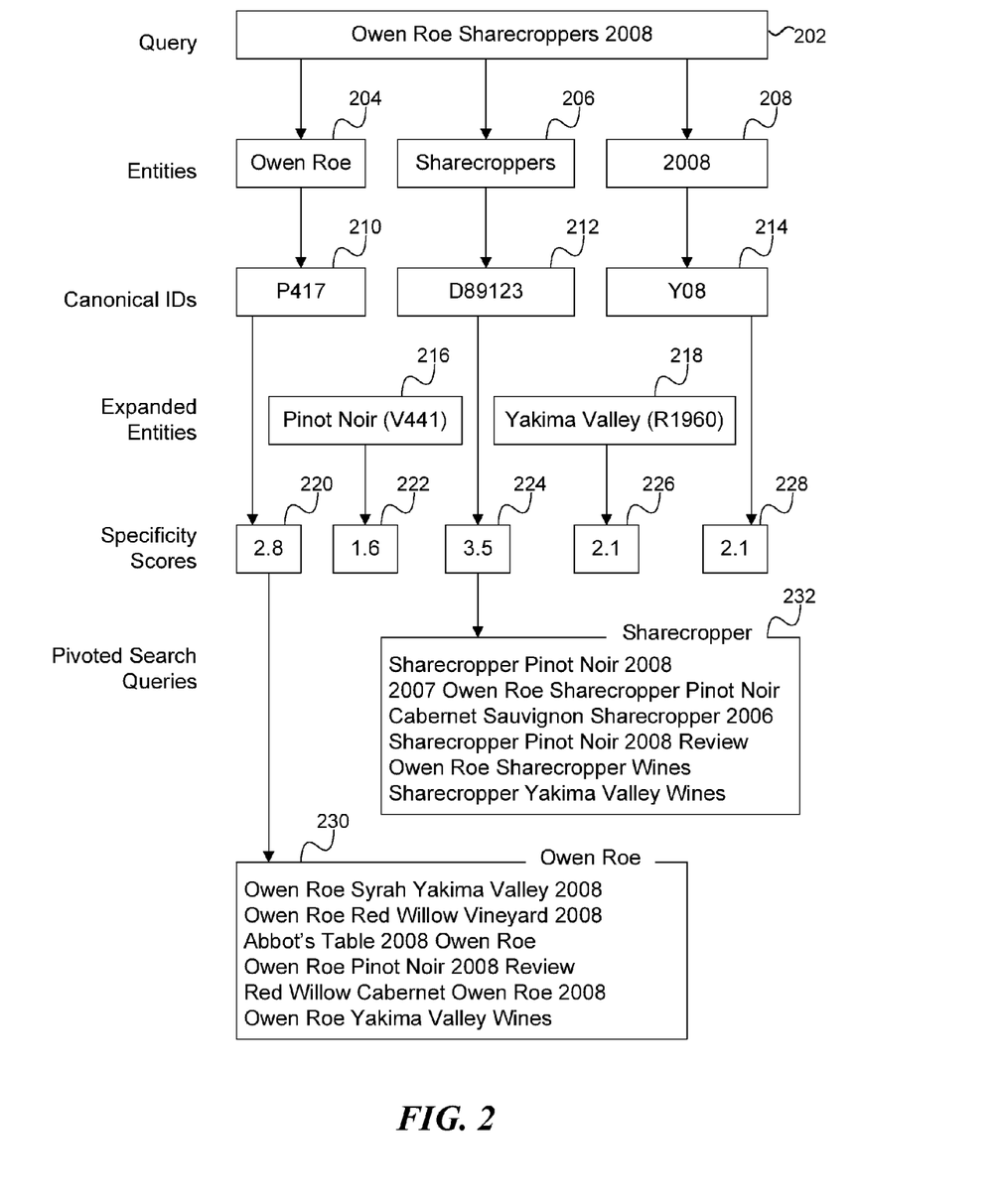
FIG. 2 shows a diagram illustrating the progression from a search query to obtaining related pivoted search queries.
Figure 3:
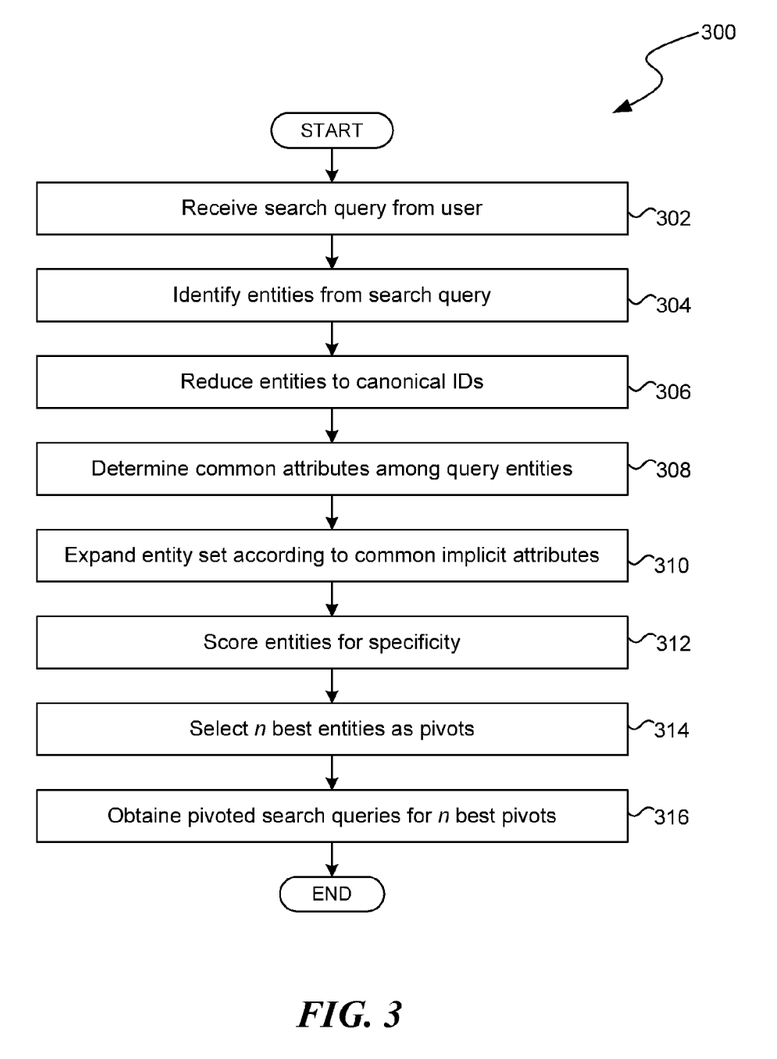
FIG. 3 is a flow diagram of an illustrative routine for selecting pivoted search queries and presenting them in a search results page responsive to a search query.

To further illustrate the process in which the search engine 110 produces pivoted search results we turn now to FIGS. 2 and 3. FIG. 2 shows a diagram illustrating the progression from an exemplary search query 202 to two corresponding sets of pivoted search queries, and FIG. 3 is a flow diagram of an illustrative routine 300 for selecting pivoted search queries and presenting them in a search results page responsive to a user's search query. Beginning at block 302, a search query is received from a user. For purposes of the discussion of FIGS. 2 and 3, it will be assumed that the user's search query is search query 202, "Owen Roe Sharecroppers 2008." At block 303, the search engine 110 processes the terms of the search query to identify its component entities. As shown in FIG. 2, the entities of the search query 202 comprise entities 202 ("Owen Roe", a vintner), 204 ("Sharecroppers", a wine label), and 206 ("2008", a vintage). At block 306, the identified entities 202-206 are reduced to their canonical identifiers as illustrated by Canonical IDs 210-214. Reducing the entities to their canonical identifies (IDs) enables the search engine to collapse seemingly distinct entities (e.g., "Paris France" and "Capital of France" are reduced to the same canonical ID) and more efficiently manage the entities, their attributes and relationships to other entities. Of course, the steps 304 and 306 of identifying entities and reducing them to their canonical IDs may be implemented as a single process, dependent upon various implementation details. They are identified here separately for illustration purposes only.

At block 308, common attributes (both implicit and explicit) among the entities are determined. The purpose of determining common attributes among entities is so that in obtaining pivoted search queries, the pivoted search queries remain relevant to and within the purpose of the user's search query. With regard to the present example, "Owen Roe" (a vintner), "Sharecroppers" (a wine label), and "2008" (a vintage) all follow a general theme centered on wine. By basing the pivoted search queries within this theme, the pivoted search queries will be at least germane and potentially highly relevant to the user's search query. On the other hand, an attribute related to only entity 204 ("Owen Roe") and not to the other entities may be its employee count and a set of pivoted search queries regarding Owen Roe's employee numbers would likely be distracting to the user given the search query's clear interest in wine.

At block 310, as part of providing one or more groups of pivoted search queries, the search engine expands the entity set by adding entities that are related to the search query entities (those entities identified in the search query) along the lines of the common attributes among the search query entities. With reference to FIG. 2, the expanded entities 216 and 218 are based on the common attributes of wine and further based on the fact that Owen Roe Sharecroppers produced Pinot Noir wines (entity 216) and that these wines came from Yakima Valley (entity 218). These entities 216 and 218 also show their canonical ids which are obtained as the entities are identified or as a separate process (not shown) after their identification.

After expanding the set of entities on which one or more pivots can be made, at block 312 each of the entities are scored according to their specificity. The purpose behind determining a specificity score for each entity is that the more specific an entity, the closer that entity likely is at representing all or a part of the user's search intent and, thus, the more important that entity becomes as a pivot entity (or one of the pivot entities when multiple entities are combined together in a pivot.) In this manner, pivoted search queries are based on the most important entities of a search query. Figure illustrates exemplary specificity scores 220-228 for each of the entities 210-218 being evaluated.

At block 314, the top n entities (or combination of entities) are selected as pivot entities for which pivot search queries will be obtained. The number n of selected pivot entities may be configurable by a search engine 110. In the example of FIG. 2, there are two pivot entities (n=2) and the two most specific entities correspond to entities 204 "Owen Roe" and 206 "Sharecroppers," as determined by their specificity scores 220 and 224. Thus, at block 316, pivoted search queries 230-232 corresponding to the selected pivot entities are obtained.

Regarding FIG. 3, it should be appreciated that while routine 300 is described in regard to discrete steps (or blocks), these steps should be viewed as being logical in nature and may or may not correspond to any actual, discrete steps. Nor should the order that these steps are presented be construed as the only order in which the various logical steps may be carried out. Those skilled in the art will appreciate that the various steps of routine 300 may be combined together or be comprised of multiple steps. Steps may be carried out in an alternative order and may also be carried out, at least in part, in parallel.

While novel aspects of the disclosed subject matter are expressed in routines or methods, this functionality may also be embodied in computer-readable media. As those skilled in the art will appreciate, computer-readable media can host computer-executable instructions for later retrieval and execution. When executed on a computing device, the computer-executable instructions carry out various steps or methods, including all or some of the steps of the routine described above. Examples of computer-readable media include, but are not limited to: optical storage media such as digital video discs (DVDs) and compact discs (CDs); magnetic storage media including, without limitation, hard disk drives, floppy disks, magnetic tape, and the like; transitory and non-transitory memory such as random access memory (RAM), read-only memory (ROM), memory cards, thumb drives, and the like; cloud storage (i.e., an online storage service); and the like. For purposes of this document, however, computer-readable media expressly excludes carrier waves and propagated signals.

Figure 4:
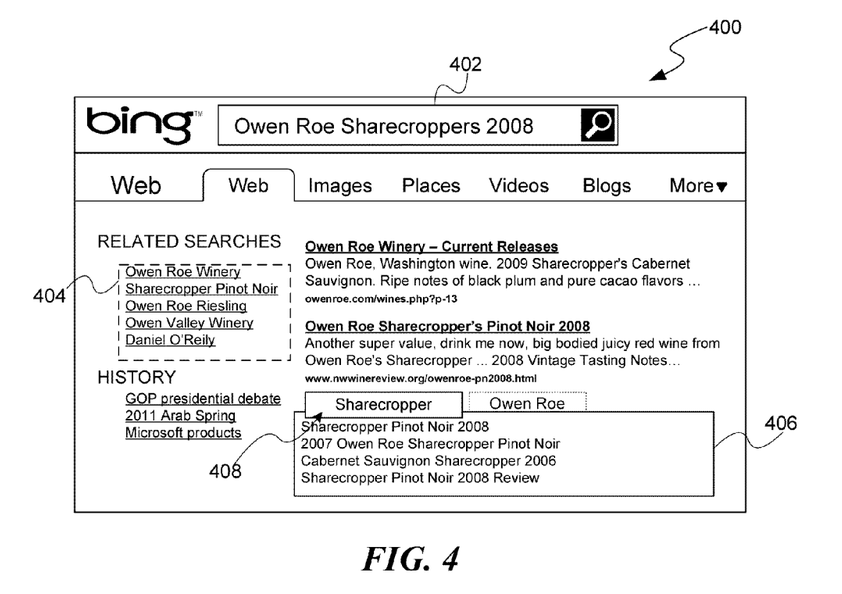
FIGS. 4 and 5 are pictorial diagrams illustrating exemplary browser views showing a portion of a search results page that includes pivoted search queries.
Figure 5:
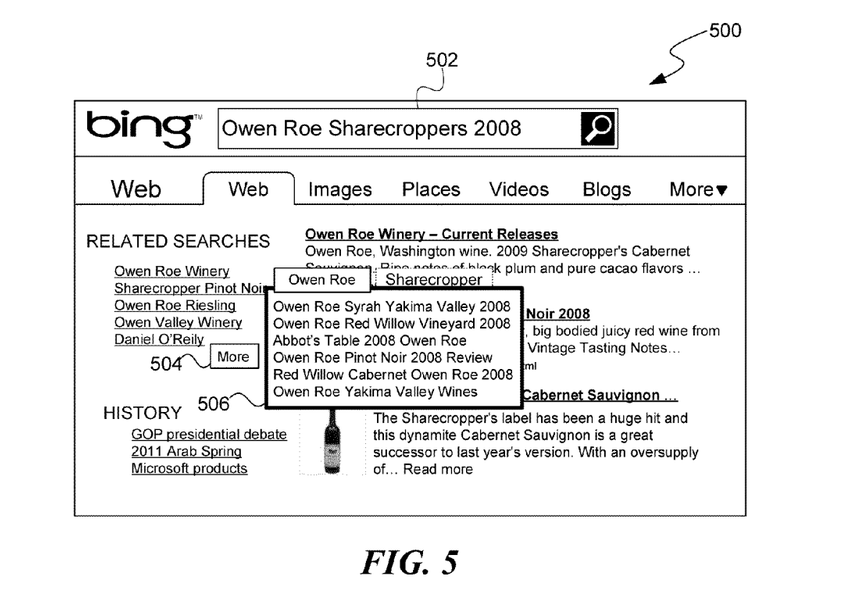

Turning now to FIGS. 4 and 5, these figures are pictorial diagrams illustrating exemplary browser views showing a portion of a search results page that includes pivoted search queries. In particular regard to FIG. 4, this browser view 400 illustrates search results responsive to the query 402, "Owen Roe Sharecroppers 2008." In this illustration a tabbed view 406 is displayed among the search results, the tabbed view displayed pivoted search results for "Sharecropper" as illustrated by the selected tab 408. The title of the selected tab 408 also provides a visual indication to the user as to the basis of the pivoted queries: i.e., in this case the search queries are related to the entity "Sharecropper."

As can be seen in this illustrative browser view 400, a set of typical recommended search results 404 is also displayed. Unlike the pivoted search results shown in tabbed view 406, the recommended search results 404 reflect the recommendations that many search engines currently offer, i.e., queries statistically related to the present query. In other words, these recommended queries follow the pattern: given query $Q_1$ (in this example, "Owen Roe Sharecroppers 2008") most people also select one of the queries among the recommended queries 404.

Turning to FIG. 5, this pictorial diagram illustrates, to the same exemplary query 502 as discussed in FIG. 4, a user actionable control that, when activated, causes a tabbed view 506 to be displayed with the pivoted search results that the search engine 110 has identified/obtained. Just as with the tabbed view of FIG. 4, this tabbed view also contains a label ("Owen Roe") that identifies the pivot entity for the currently viewed pivoted search queries.

Of course, while both FIGS. 4 and 5 present the pivoted search queries in tabbed views, these are only examples of how the pivoted search queries could be presented. In various embodiments, the pivoted search queries may be presented in-line with the search results, grouped on the left- and/or right-hand sides of the search results page, and the like. Accordingly, the presentation of the pivoted search queries in the tabbed views of FIGS. 4 and 5 should be viewed as illustrative only and not construed as limiting upon any embodiment of the disclosed subject matter.

Figure 6:
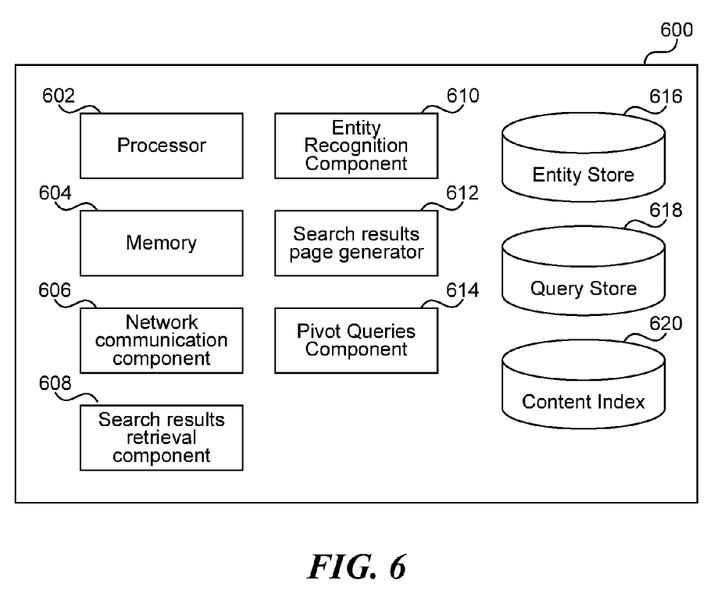
FIG. 6 is a block diagram of exemplary components of a search engine configured to respond to a search query with search results and one or more groupings of pivoted search queries.

Turning now to FIG. 6, this figure shows a block diagram 600 of exemplary components of a search engine 110 configured to respond to a search query with search results and one or more sets of pivoted search queries. The search engine 110 includes a processor 602 and a memory 604. As those skilled in the art will appreciate, the processor 602 executes instructions retrieved from memory 604 in carrying out various aspects of the search engine 110 in responding to search queries, including incorporating pivoted search queries within a search results page.

The search engine 110 also includes a network communications component 606 through which the search engine sends and receives communications over the network 108. For example, it is through the network communication component 606 that the search engine 110 receives search queries from user computers, such as user computers 102-106 and 118, and returns results responsive to the search queries. The search engine 110 further includes a search results retrieval component 614 through which the search engine obtains search results from a content index 620 in response to receiving a user's search query.

Configured according to aspects of the disclosed subject matter, the search engine 110 also includes an entity recognition component 610. It is through this entity recognition component 610 that the search engine identifies the search query entities and the expanded entities from an entity store 616. Further, the entity recognition component 610 reduces the entities to their canonical IDs. Specificity values will often be associated with the entities in the entity store 616 though, in alternative embodiments, the specificity scores may be determined dynamically by the pivot queries component 614. Additionally the pivot queries component 614 will typically be configured to identify one or more pivot entities (according to the specificity scores of the entities) for a search query and obtains corresponding pivoted search queries from the query store 618.

Finally, the search engine 110 will include a search results page generator 612 that will take the obtained search results and generate one or more search results pages in response to the search query. In at least one search results page, the search results page generator 612 will also include one or more pivoted search queries according to the selected pivot entities. According to aspects of the disclosed subject matter, the search results page generator 612 will include with the pivoted search queries an indication identifying a set of pivoted search queries as being pivoted around a pivot entity (or combination of pivot entities) such that the user can determine the basis for the recommended (pivoted) search queries.

Though various components have been described above as actual and/or physical components, it should be appreciated that many, if not all, of these components may be logical components. In an actual embodiment, these components may be combined together and/or distributed among any number of sub-components. Moreover, all or some of these components may be implemented in software, firmware, online services, and the like. According, the illustrated block diagram 600 should be viewed as illustrative, and not limiting, of the various components of an exemplary search engine 110 configured to provide search results with pivoted search queries.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for responding to a search query, the method comprising each of the following as implemented on a computer comprising at least a processor and a memory:
   identifying a plurality of entities specified in a search query received from a user;
   obtaining a set of search results responsive to the search query;
   selecting a pivot entity from the plurality of entities;
   identifying a pivoted set of search queries relating to the pivot entity;
   generating a search results page responsive to the search query, the search results page including at least some of the obtained search results and the pivoted set of search queries; and
   returning the search results page to the user responsive to the search query.

2. The method of claim 1, wherein selecting the pivot entity from the plurality of entities comprises:
   obtaining a specificity score for each of the plurality of entities; and
   selecting the pivot entity having the highest degree of specificity according to the specificity scores.

3. The method of claim 2 further comprising identifying an expanded set of entities related to the plurality of entities specified in the search query, and wherein selecting the pivot entity from the plurality of entities comprises selecting the pivot entity from the plurality of entities and the expanded set of entities.

4. The method of claim 3 wherein identifying an expanded set of entities related to the plurality of entities specified in the search query comprises identifying an expanded set of entities related to the plurality of entities specified in the search query according to common attributes between the plurality of entities specified in the search query.

5. The method of claim 2 wherein generating a search results page responsive to the search query includes identifying the pivoted set of search queries as being related to the selected pivot entity.

6. The method of claim 1 wherein generating a search results page responsive to the search query includes identifying the pivoted set of search queries as being related to the selected pivot entity.

7. The method of claim 1 further comprising identifying an expanded set of entities related to the plurality of entities specified in the search query, and wherein selecting the pivot entity from the plurality of entities further comprises selecting the pivot entity from the plurality of entities and the expanded set of entities.

8. The method of claim 1 wherein identifying the plurality of entities specified in a search query received from a user comprises identifying the plurality of entities specified in a search query according to their canonical forms.

9. The method of claim 1 wherein the generated search results page further includes a set of recommended search queries based on a statistical relationship of the search query to the set of recommended search queries.

10. A computer system for responding to a search query, the system comprising a processor and a memory, wherein the processor executes instructions stored in the memory as part of or in conjunction with additional components to respond to a search query, the additional components comprising:
    a network communication component for communicating with one or more computing devices over a communication network;
    a search results retrieval component that obtains a plurality of search results responsive to receiving a search query;
    an entity recognition component that identifies a plurality of entities from the query terms of the search query;
    a pivot queries component that selects a pivot entity from the plurality of identified entities and obtains a pivoted set of search queries relating to the pivot entity; and
    a search results page generator component that generates a search results page and returns the generated search results page responsive to the search query, wherein the generated search results page includes a subset of the plurality of obtained search results responsive to the search query, and further includes a subset of the pivoted set of search queries, the subset of the pivoted set of search queries being visually grouped together on the search results page.

11. The computer system of claim 10, wherein the pivot queries component selects the pivot entity highest degree of specificity of the plurality of identified entities.

12. The computer system of claim 11, wherein the pivot queries component determines a specificity score for each of the plurality of entities and selects the pivot entity highest degree of specificity of the plurality of identified entities according to the determined specificity scores.

13. The computer system of claim 10, wherein the search results page generator component identifies the subset of pivoted set of search queries as being related to the selected pivot entity.

14. The computer system of claim 13, wherein the search results page generator component further includes a set of recommended search queries based on a statistical relationship of the search query to the set of recommended search queries.

15. The computer system of claim 10, wherein the entity recognition component identifies an expanded set of entities related to one or more entities specified in the search query, and identifies the plurality of entities from the query terms of the search query and from the expanded set of entities.

16. The computer system of claim 15, wherein the entity recognition component identifies the expanded set of entities according to common attributes between the one or more entities specified in the search query.

17. A computer readable medium having computer executable instructions which, when executed on a computer system having at least a processor and a memory, carry out a method for responding to a search query, the method comprising the steps of:
    identifying a plurality of entities specified in a search query received from a user;
    obtaining a set of search results responsive to the search query;
    obtaining a specificity score for each of the plurality of entities and selecting a pivot entity having the highest degree of specificity of the plurality of identified entities;
    identifying a pivoted set of search queries relating to the pivot entity;
    generating a search results page responsive to the search query, the search results page including at least some of the obtained search results and the pivoted set of search queries, wherein the pivoted set of search queries is identified as being related to the selected pivot entity; and returning the search results page to the user responsive to the search query.

18. The computer readable medium of claim 17, wherein the method further comprises identifying an expanded set of entities related to the plurality of entities specified in the search query, and wherein selecting the pivot entity from the plurality of entities comprises selecting the pivot entity from the plurality of entities and the expanded set of entities.

19. The computer readable medium of claim 17, wherein the expanded set of entities are related to the plurality of entities specified in the search query according to common attributes among the plurality of entities specified in the search query.

20. The computer readable medium of claim 17, wherein the generated search results page further includes a set of recommended search queries based on a statistical relationship of the search query to the set of recommended search queries.

* * * * *